(12) United States Patent
Imoto

(10) Patent No.: US 12,233,812 B2
(45) Date of Patent: Feb. 25, 2025

(54) GAS GENERATOR

(71) Applicant: DAICEL CORPORATION, Osaka (JP)

(72) Inventor: Katsuhiro Imoto, Tokyo (JP)

(73) Assignee: Daicel Corporation, Osaka (JP)

( * ) Notice: Subject to any disclaimer, the term of this patent is extended or adjusted under 35 U.S.C. 154(b) by 0 days.

(21) Appl. No.: 18/538,610

(22) Filed: Dec. 13, 2023

(65) Prior Publication Data

US 2024/0109509 A1  Apr. 4, 2024

Related U.S. Application Data

(63) Continuation of application No. PCT/JP2022/015811, filed on Mar. 30, 2022.

(30) Foreign Application Priority Data

Jun. 17, 2021 (JP) ................................ 2021-100577

(51) Int. Cl.
*B60R 21/274* (2011.01)
*B60R 21/26* (2011.01)
*B60R 21/268* (2011.01)

(52) U.S. Cl.
CPC .. *B60R 21/274* (2013.01); *B60R 2021/26029* (2013.01); *B60R 2021/2685* (2013.01)

(58) Field of Classification Search
CPC . B60R 21/274; B60R 21/264; B60R 21/2644; B60R 2021/2685;

(Continued)

(56) References Cited

U.S. PATENT DOCUMENTS 6,032,979 A * 3/2000 Mossi ................ B60R 21/2644
                                                        280/736
6,562,161 B1   5/2003 Yamato et al.
(Continued)

FOREIGN PATENT DOCUMENTS

JP          H11-348711 A      12/1999
WO       WO-2019098089 A1 *   5/2019  ............... B01J 7/00

OTHER PUBLICATIONS

International Search Report dated Jun. 21, 2022, issued in counterpart Application No. PCT/JP2022/015811, with English translation. (5 pages).

(Continued)

*Primary Examiner* — James A English
(74) *Attorney, Agent, or Firm* — WHDA, LLP

(57) ABSTRACT

A gas generator comprising, a first ignition device, a first inner tube member including therein the first ignition device and a surrounding wall portion provided with one or a plurality of communication holes, the surrounding wall portion including, in a circumferential direction thereof, a combustion product discharge region and a combustion product non-discharge region, and a housing including a peripheral wall portion and defining therein a first combustion chamber, the peripheral wall portion being provided with a first gas discharge port and a second gas discharge port having an opening pressure higher than the first gas discharge port, and a communication hole-associated region associated with the combustion product discharge region and including only the first gas discharge port formed therein and a communication hole non-associated region associated with the combustion product non-discharge region and including the second gas discharge port formed therein.

14 Claims, 10 Drawing Sheets

(58) Field of Classification Search
CPC .... B60R 2021/2633; B60R 2021/2648; B60R 2021/26029
See application file for complete search history.

(56) References Cited

U.S. PATENT DOCUMENTS

| | | | |
|---|---|---|---|
| 6,722,694 | B1 | 4/2004 | Nakashima et al. |
| 6,929,284 | B1* | 8/2005 | Saso .................. B60R 21/2644 |
| | | | 280/736 |
| 7,055,855 | B2* | 6/2006 | Nakashima ......... B60R 21/2644 |
| | | | 280/736 |
| 7,150,227 | B2* | 12/2006 | Matsuda ............. B60R 21/2644 |
| | | | 102/202 |
| 8,382,155 | B2* | 2/2013 | Nakayasu ........... B60R 21/2644 |
| | | | 280/741 |
| 2002/0053788 | A1 | 5/2002 | Iwai et al. |
| 2003/0137139 | A1 | 7/2003 | Iwai et al. |
| 2017/0043742 | A1* | 2/2017 | Ueda ..................... B60R 21/264 |
| 2019/0023220 | A1* | 1/2019 | Takizawa ............ B60R 21/2644 |
| 2019/0241149 | A1* | 8/2019 | Kobayashi ............ B60R 21/268 |
| 2020/0254962 | A1* | 8/2020 | Yamamoto ............ B60R 21/264 |

OTHER PUBLICATIONS

Written Opinion dated Jun. 21, 2022, issued in counterpart Application No. PCT/JP2022/015811, with English Translation. (8 pages).

* cited by examiner

GAS GENERATOR

TECHNICAL FIELD

The present invention relates to a gas generator.

BACKGROUND ART

In the related art, a gas generator is widely used in which an igniter and a gas generating agent are disposed in a housing, the igniter is surrounded by an inner tube member, a communication hole is formed in the inner tube member, the gas generating agent is burned by a combustion product discharged from the communication hole when the igniter is activated, and the combustion gas is discharged to the outside from a plurality of gas discharge ports formed in the housing.

To determine the output performance of the gas generator, factors such as the discharge amount and discharge time of the combustion gas are used as parameters. It is important to burn the gas generating agent as desired to achieve the desired output performance. The combustion performance of the gas generating agent varies depending on the ambient temperature and pressure during combustion. In general, the higher the temperature or the higher the pressure, the more actively the gas generating agent reacts (is burned). That is, as the temperature or pressure increases, the combustion performance of the gas generating agent improves and the internal pressure of the housing during combustion more easily increases. On the other hand, in a low temperature and low pressure environment, the gas generating agent is not burned as actively. Thus, to reduce the difference in output performance of the gas generator between when the temperature is high and when the temperature is low and stabilize the output performance, it is necessary to increase the internal pressure of the housing at a low temperature and improve the combustion performance of the gas generating agent. In relation to this, to suppress a decrease in the combustion performance of the gas generating agent at a low temperature, a technique is known in which a rupture pressure of a closing member that closes some gas discharge ports is made higher than a rupture pressure of a closing member that closes other gas discharge ports, and only the other gas discharge ports are opened at a low temperature to increase the internal pressure of the housing (e.g., Patent Document 1).

CITATION LIST

Patent Document

Patent Document 1: JP 11-348711 A
Patent Document 2: U.S. Pat. No. 6,722,694

SUMMARY OF INVENTION

Technical Problem

Here, since the force of the combustion product discharged from the communication hole of the inner tube member is strong, the gas generating agent in the housing may be burned preferentially from near the communication hole in the circumferential direction of the inner tube member. Thus, it is presumed that the gas generating agent tends to non-uniformly burn due to the location of the communication hole and that the pressure and temperature instantaneously become uneven (imbalanced) in the housing. In particular, when the inner tube member accommodating the ignition device is tilted with respect to the center of the housing, the ignition environment and the combustion environment of the gas generating agent differ in the circumferential direction, and thus uneven ignition tends to occur.

In the gas generator in the related art, the gas discharge ports are not disposed in the housing in consideration of the uneven combustion of the gas generating agent caused by the location of the communication hole in the inner tube member as described above. Thus, even when some gas discharge ports are made more difficult to open than the other gas discharge ports by varying the rupturing pressures of the closing members, not only the other gas discharge ports but also the some gas discharge ports may open at a low temperature. Accordingly, the combustion gas in the housing easily escapes because extra gas discharge ports are open, and thus the internal pressure of the housing becomes lower than expected. As a result, the expected combustion performance of the gas generating agent cannot be achieved, and the output performance of the gas generator cannot be stabilized.

The technique of the present disclosure has been made in view of the above problems, and an object thereof is to provide a gas generator having stable output performance.

Solution to Problem

To solve the above problem, the technique of the present disclosure adopts the following configuration. That is, the technique of the present disclosure is a gas generator including a first ignition device, a first combustion chamber in which the first ignition device is disposed, a housing including a peripheral wall portion having a tubular shape, a top plate portion provided at one end of the peripheral wall portion, and a bottom plate portion provided at another end of the peripheral wall portion and facing the top plate portion, the bottom plate portion defining the first combustion chamber together with the peripheral wall portion and the top plate portion, the first ignition device being fixed to the bottom plate portion, a first inner tube member including a surrounding wall portion that has a tubular shape and surrounds the first ignition device, the first inner tube member forming an ignition unit chamber between the first inner tube member and the first ignition device, the first inner tube member including one or a plurality of communication holes formed in the surrounding wall portion, the one or plurality of communication holes allowing the ignition unit chamber and an outside of the first inner tube member to communicate with each other, a first gas generating agent disposed in the first combustion chamber and surrounding the surrounding wall portion, the first gas generating agent being configured to be burned by a combustion product discharged from the ignition unit chamber through the one or plurality of communication holes by activation of the first ignition device, and a plurality of gas discharge ports formed in the housing, the plurality of gas discharge ports allowing the first combustion chamber and an outside of the housing to communicate with each other by opening upon receiving a combustion pressure of the first gas generating agent, wherein the plurality of gas discharge ports include a first gas discharge port and a second gas discharge port, the second gas discharge port having an opening pressure higher than an opening pressure of the first gas discharge port, the surrounding wall portion is divided, in a circumferential direction of the surrounding wall portion, into a combustion product discharge region in which the one communication hole is disposed or the plurality of communication holes are collectively disposed and a combustion product non-discharge region being a region other than the combustion product discharge region, the peripheral wall portion is divided, in a circumferential direction of the peripheral wall portion, into a communication hole-associated region associated with the combustion product discharge region and a communication hole non-associated region associated with the combustion product non-discharge region, and, among the communication hole-associated region and the communication hole non-associated region, the first gas discharge port is formed only in the communication hole-associated region, and the second gas discharge port is formed only in the communication hole non-associated region.

According to such a gas generator, by forming the first gas discharge port only in the communication hole-associated region associated with the combustion product discharge region, the first gas discharge port having a low opening pressure can be more easily opened, and by forming the second gas discharge port only in the communication hole non-associated region, the second gas discharge port having a high opening pressure can be made more difficult to open. This makes it possible to more reliably open only the first gas discharge port during low-temperature activation. Thus, it is possible to reliably increase the internal pressure of the housing and the combustion performance of the gas generating agent during low-temperature activation. As a result, the gas generator according to the present disclosure can reduce the difference between the output performance during low-temperature activation and the output performance during high-temperature activation and stabilize output performance.

In addition, in the gas generator according to the present disclosure, in the peripheral wall portion, the communication hole-associated region may be a region facing the combustion product discharge region in a radiation direction with a center axis of the surrounding wall portion as a center.

In addition, in the gas generator according to the present disclosure, a range of the communication hole-associated region may be defined by a first imaginary straight line extending from a center axis of the surrounding wall portion, passing through one end portion of the combustion product discharge region in the circumferential direction of the surrounding wall portion and intersecting the peripheral wall portion, and a second imaginary straight line extending from the center axis of the surrounding wall portion, passing through another end portion of the combustion product discharge region in the circumferential direction of the surrounding wall portion and intersecting the peripheral wall portion, as viewed in an axial direction of the surrounding wall portion.

In addition, in the gas generator according to the present disclosure, a center axis of the surrounding wall portion and a center axis of the peripheral wall portion may be spaced apart, the surrounding wall portion may include a first combustion product discharge region and a second combustion product discharge region, the first combustion product discharge region and the second combustion product discharge region being the combustion product discharge regions located line-symmetrically to each other with an imaginary center line passing through the center axis of the surrounding wall portion and the center axis of the peripheral wall portion as an axis of symmetry, as viewed in the axial direction of the surrounding wall portion, the peripheral wall portion may include a first communication hole-associated region and a second communication hole-associated region, the first communication hole-associated region being the communication hole-associated region associated with the first combustion product discharge region, and the second communication hole-associated region being the communication hole-associated region associated with the second combustion product discharge region, the one or plurality of communication holes may be formed and disposed line-symmetrically with the imaginary center line as an axis of symmetry in each of the first combustion product discharge region and the second combustion product discharge region, and the first gas discharge port may be formed and disposed line-symmetrically with the imaginary center line as an axis of symmetry in each of the first communication hole-associated region and the second communication hole-associated region.

In addition, the gas generator according to the present disclosure may be configured such that an opening pressure of the first gas discharge port formed in the first communication hole-associated region and an opening pressure of the first gas discharge port formed in the second communication hole-associated region are equal to each other.

In addition, the gas generator according to the present disclosure may further include a second ignition device, a second gas generating agent configured to be burned by activation of the second ignition device, a second combustion chamber in which the second ignition device and the second gas generating agent are disposed, and a second inner tube member having a tubular shape and being disposed in the housing, the second combustion chamber being formed in the second inner tube member, wherein the second inner tube member is disposed at a position not between the combustion product discharge region and the communication hole-associated region in a radiation direction with a center axis of the surrounding wall portion as a center.

In addition, in the gas generator according to the present disclosure, the one or plurality of communication holes may be formed as a single hole extending in the circumferential direction of the surrounding wall portion over the combustion product discharge region.

Advantageous Effects of Invention

According to the technique of the present disclosure, it is possible to provide a gas generator having stable output performance.

DESCRIPTION OF EMBODIMENTS

A gas generator according to an embodiment of the present disclosure will be described below with reference to the drawings. It should be noted that the respective configurations and the combinations thereof in the respective embodiments are mere examples, and the configurations can be added, omitted, substituted, and differently modified as appropriate within a scope not departing from the spirit of the present invention. The present disclosure is not limited by the embodiments, but only limited by the claims.

First Embodiment

Figure 1:
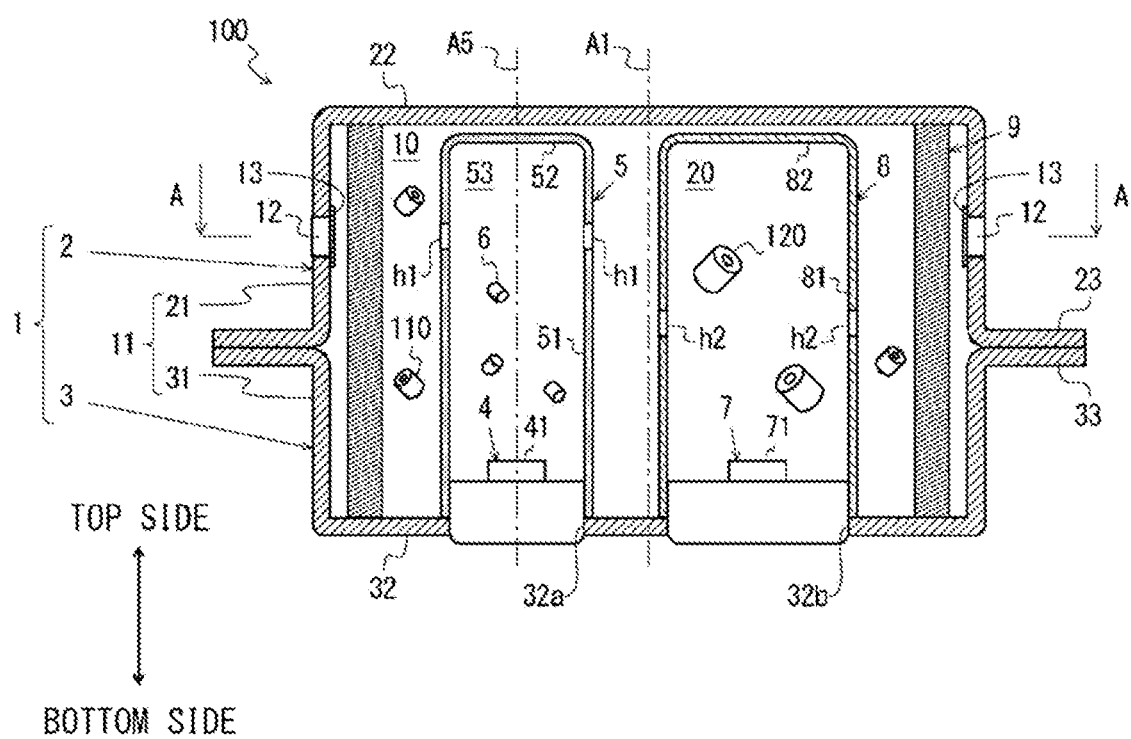
FIG. 1 is a longitudinal cross-sectional view of a gas generator according to a first embodiment.

FIG. 1 is a longitudinal cross-sectional view of a gas generator 100 according to a first embodiment. More specifically, FIG. 1 is a cross-sectional view including a housing center axis denoted by a reference sign A1 and an inner tube center axis denoted by a reference sign A5. FIG. 1 illustrates a state of the gas generator 100 before activation. The gas generator 100 is an airbag gas generator used for an airbag, for example.

Overall Configuration

As illustrated in FIG. 1, the gas generator 100 includes a first ignition device 4, a first inner tube member 5, a transfer charge 6, a second ignition device 7, a second inner tube member 8, a filter 9, a first gas generating agent 110, a second gas generating agent 120, and a housing 1 that houses these elements. The gas generator 100 is configured as a so-called dual-type gas generator including two ignition devices. The gas generator 100 is also configured to activate a first igniter 41 included in the first ignition device 4 to burn the first gas generating agent 110, activate a second igniter 71 included in the second ignition device 7 to burn the second gas generating agent 120, and discharge combustion gas, which is a combustion product of these gas generating agents, from gas discharge ports 12 formed in the housing 1. Hereinafter, each configuration of the gas generator 100 will be described. In the present specification, the activation of the igniter included in the ignition device may be expressed as "activation of the ignition device" for convenience.

Housing

An upper shell 2 and a lower shell 3 each formed of metal and formed into a bottomed substantially cylindrical shape are joined in a state where respective open ends face each other. Thus, the housing 1 is formed in a short cylindrical shape including a tubular peripheral wall portion denoted by a reference sign 11 and in which both ends of the peripheral wall portion 11 in an axial direction are closed. The housing center axis A1 in FIG. 1 is a center axis of the peripheral wall portion 11. Here, a direction along the housing center axis A1 is defined as a vertical direction of the gas generator 100, where the side of the upper shell 2 (i.e., the top side in FIG. 1) is defined as a top side of the gas generator 100, and the side of the lower shell 3 (i.e., the bottom side in FIG. 1) is defined as a bottom side of the gas generator 100.

The upper shell 2 has an upper peripheral wall portion 21 in a cylindrical shape and a top plate portion 22 that closes the upper end of the upper peripheral wall portion 21, thereby forming an internal space. An opening portion of the upper shell 2 is formed by a lower end portion of the upper peripheral wall portion 21. A joining portion 23 extending radially outward is connected to the lower end portion of the upper peripheral wall portion 21. The lower shell 3 has a lower peripheral wall portion 31 having a cylindrical shape and a bottom plate portion 32 that closes the lower end of the lower peripheral wall portion 31, thereby forming an internal space. A joining portion 33 extending radially outward is connected to an upper end portion of the lower peripheral wall portion 31. A first mounting hole 32a for mounting the first ignition device 4 at the bottom plate portion 32 and a second mounting hole 32b for mounting the second ignition device 7 at the bottom plate portion 32 are formed in the bottom plate portion 32.

The joining portion 23 of the upper shell 2 and the joining portion 33 of the lower shell 3 are overlapped and joined by laser welding or the like to form the housing 1 having a short cylindrical shape with both axial ends closed. The upper peripheral wall portion 21 of the upper shell 2 and the lower peripheral wall portion 31 of the lower shell 3 form the peripheral wall portion 11 that is tubular and connects the top plate portion 22 and the bottom plate portion 32. That is, the housing 1 includes the peripheral wall portion 11 that is tubular, the top plate portion 22 provided at one end of the peripheral wall portion 11, and the bottom plate portion 32 provided at the other end and facing the top plate portion 22. The peripheral wall portion 11, the top plate portion 22, the bottom plate portion 32, and the second inner tube member 8 described below define a first combustion chamber 10. The first combustion chamber 10 is formed as a space in the internal space of the housing 1, excluding a second combustion chamber 20 that is an internal space of the second inner tube member 8. The first ignition device 4, the first inner tube member 5, the transfer charge 6, the filter 9, and the first gas generating agent 110 are disposed in the first combustion chamber 10. A center axis of the first combustion chamber 10 coincides with the housing center axis A1.

Here, in the housing 1, a plurality of the gas discharge ports 12 that allow the first combustion chamber 10 and the external space of the housing 1 to communicate with each other are formed side by side along the circumferential direction. In more detail, the plurality of gas discharge ports 12 are formed in the upper peripheral wall portion 21 of the peripheral wall portion 11. The gas discharge ports 12 are closed by a seal tape 13 provided on the inner peripheral surface of the peripheral wall portion 11 in a state before the first ignition device 4 and the second ignition device 7 are activated. The seal tape 13, which is an example of a closing member, is ruptured by the pressure of the combustion gas, to thereby open the gas discharge ports 12. In the present specification, the pressure required to open the gas discharge ports 12 is referred to as an "opening pressure". In the case of this example, the opening pressure is a pressure required to rupture the seal tape 13.

Ignition Device

As illustrated in FIG. 1, the first ignition device 4 is fixed in the first mounting hole 32a formed in the bottom plate portion 32 of the lower shell 3. The first ignition device 4 includes the first igniter 41. The second ignition device 7 is fixed in the second mounting hole 32b formed in the bottom plate portion 32 of the lower shell 3. The second ignition device 7 includes the second igniter 71. Each of the first igniter 41 and the second igniter 71 accommodates an ignition charge (not illustrated) therein and is activated by being supplied with an ignition current. Upon activation, the ignition charge burns and a combustion product is discharged to the outside. The first ignition device 4 and the second ignition device 7 are activated independently of each other. When activating the second ignition device 7, the second ignition device 7 is activated simultaneously with the activation of the first ignition device 4 or at a predetermined timing after the activation of the first ignition device 4. Compared with a so-called single-type gas generator, the gas generator 100 can discharge a large amount of combustion gas to the outside with various output profiles by the combustion of the first gas generating agent 110 combusted by activating the first ignition device 4 and the combustion of the second gas generating agent 120 combusted by activating the second ignition device 7. The second ignition device 7 is not always activated. The gas generator 100 may activate the first ignition device 4 and the second ignition device 7 depending on the strength of an impact sensed by a sensor (not illustrated), for example, only activating the first ignition device 4 without activating the second ignition device 7 when the impact is weak, or simultaneously activating the first ignition device 4 and the second ignition device 7 when the impact is strong.

Inner Tube Member

The first inner tube member 5 is a tubular member extending from the bottom plate portion 32 toward the top plate portion 22. The first inner tube member 5 includes a tubular surrounding wall portion 51 and a lid wall portion 52 that closes one end portion of the surrounding wall portion 51. The first ignition device 4 is fitted or press-fitted to the other end portion of the surrounding wall portion 51, and thus the first inner tube member 5 is mounted at the bottom plate portion 32. An inner tube center axis A5 illustrated in FIG. 1 is a center axis of the surrounding wall portion 51. As illustrated in FIG. 1, in the gas generator 100, the first inner tube member 5 is disposed such that the inner tube center axis A5 is spaced apart from the housing center axis A1 of the peripheral wall portion 11. Further, the inner tube center axis A5 is parallel to the housing center axis A1. As illustrated in FIG. 1, the first ignition device 4 is surrounded by the surrounding wall portion 51 to form an ignition unit chamber 53 between the first inner tube member 5 and the first ignition device 4. The transfer charge 6 that is burned by the activation of the first ignition device 4 is accommodated in the ignition unit chamber 53. The surrounding wall portion 51 of the first inner tube member 5 is provided with a plurality of communication holes h1 that allow the internal space (i.e., the ignition unit chamber 53) and the external space to communicate with each other. The communication holes h1 are closed by a seal tape (not illustrated) in a state before the first ignition device 4 is activated. In addition, instead of using the lid wall portion, for example, the surrounding wall portion 51 including an open upper end portion may be joined to the top plate portion of the housing by welding or the like. Further, the communication holes h1 are disposed at the same height as the gas discharge ports 12 (height from the bottom plate portion 32). However, the heights of the communication holes h1 may be different from the heights of the gas discharge ports 12.

The second inner tube member 8 is a tubular member extending from the bottom plate portion 32 toward the top plate portion 22 and includes a tubular surrounding wall portion 81 and a lid wall portion 82 that closes one end portion of the surrounding wall portion 81. The second ignition device 7 is fitted or press-fitted to the other end portion of the surrounding wall portion 81, and thus the second inner tube member 8 is mounted at the bottom plate portion 32. As illustrated in FIG. 1, the second combustion chamber 20 in which the second ignition device 7 and the second gas generating agent 120 that is burned by the activation of the second ignition device 7 are disposed is formed inside the second inner tube member 8. The surrounding wall portion 81 of the second inner tube member 8 is also provided with a plurality of communication holes h2 that allow the internal space (i.e., the second combustion chamber 20) and the external space (i.e., the first combustion chamber 10) to communicate with each other. The communication holes h2 are closed by a seal tape (not illustrated) in a state before the second ignition device 7 is activated.

Filter

As illustrated in FIG. 1, the filter 9 is formed into a tubular shape and is disposed in the first combustion chamber 10 such that the filter 9 surrounds the first gas generating agent 110 and the gas discharge ports 12 are located outside the filter 9 in the radial direction thereof. That is, the filter 9 is disposed between the first gas generating agent 110 and the gas discharge ports 12 and surrounds the first gas generating agent 110. Of both end surfaces of the filter 9 in the axial direction, one end surface (upper end surface) is in contact with and supported by the top plate portion 22 of the upper shell 2, and the other end surface (lower end surface) is in contact with and supported by the bottom plate portion 32 of the lower shell 3. When the combustion gas of the first gas generating agent 110 and the second gas generating agent 120 passes through the filter 9, the filter 9 cools the combustion gas by removing heat of the combustion gas. In addition to the cooling function of the combustion gas, the filter 9 has a function of filtering the combustion gas by collecting combustion residue contained in the combustion gas.

Transfer Charge

In addition to a known black powder, a gas generating agent having good ignition properties and a higher combustion temperature than the first gas generating agent 110 can be used as the transfer charge 6. The combustion temperature of the transfer charge 6 can be set in a range of 1700 to 3000° C. As the transfer charge 6, a known transfer charge containing, for example, nitroguanidine (34 wt %) and strontium nitrate (56 wt %) can be used. In addition, the transfer charge 6 may have various shapes, such as a granular shape, a pellet shape, a columnar shape, or a disk shape.

Gas Generating Agent

As the first gas generating agent 110 and the second gas generating agent 120, a gas generating agent having a relatively low combustion temperature can be used. The combustion temperature of each of the first gas generating agent 110 and the second gas generating agent 120 can be set in the range of 1000 to 1700° C. As the first gas generating agent 110 and the second gas generating agent 120, a known gas generating agent containing, for example, guanidine nitrate (41 wt %), basic copper nitrate (49 wt %), a binder, and an additive can be used. The first gas generating agent 110 and the second gas generating agent 120 may also have a variety of shapes, such as a granular shape, a pellet shape, a cylindrical shape, or a disk shape.

Communication Hole

Figure 2:
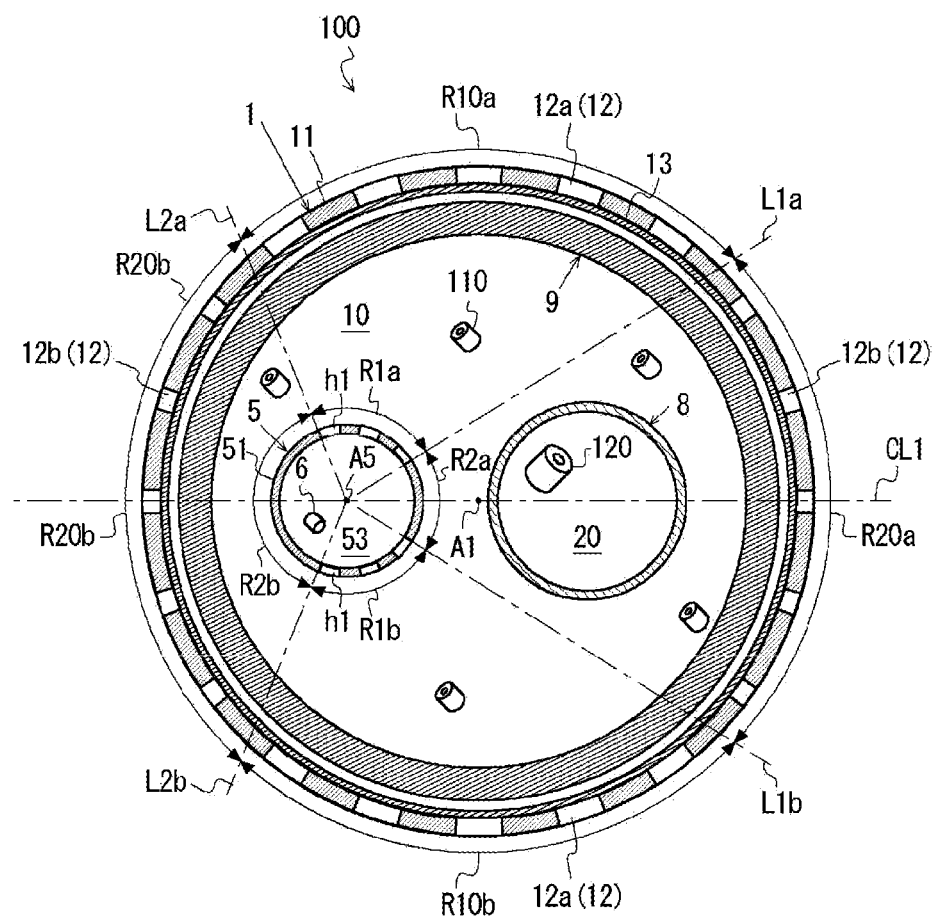
FIG. 2 is a cross-sectional view taken along line A-A of FIG. 1.

FIG. 2 is a cross-sectional view taken along line A-A of FIG. 1. FIG. 2 illustrates a cross-section of a gas generator 100 before activation, which is orthogonal to the housing center axis A1 and the inner tube center axis A5. In FIG. 2, the first ignition device 4, the second ignition device 7, the joining portion 23, and the joining portion 33 are omitted for convenience. As illustrated in FIG. 2, an imaginary straight line passing through the housing center axis A1 and the inner tube center axis A5 as viewed in the axial direction of the surrounding wall portion 51 is defined as an imaginary center line CL1.

As illustrated in FIG. 2, the plurality of communication holes h1 are unevenly disposed in the circumferential direction of the surrounding wall portion 51. Specifically, communication hole groups each including three communication holes h1 close to each other in the circumferential direction of the surrounding wall portion 51 are formed at two positions of the surrounding wall portion 51. The two communication hole groups are formed at line-symmetric positions with the imaginary center line CL1 as an axis of symmetry. Thus, the surrounding wall portion 51 of the first inner tube member 5 is divided, in the circumferential direction, into combustion product discharge regions R1a and R1b in which the plurality of communication holes h1 are collectively disposed and combustion product non-discharge regions R2a and R2b that are regions of the surrounding wall portion 51 other than the combustion product discharge regions R1a and R1b. That is, the combustion product discharge regions R1a and R1b are regions where the communication holes h1 are disposed, and the combustion product non-discharge regions R2a and R2b are regions where the communication holes h1 are not disposed. The combustion product discharge regions R1a and R1b are located line-symmetrically with the imaginary center line CL1 as the axis of symmetry. Here, as illustrated in FIG. 2, as viewed in the axial direction of the surrounding wall portion 51, a straight line extending from the inner tube center axis A5, passing through one end portion of the combustion product discharge region R1a in the circumferential direction and intersecting with the peripheral wall portion 11 is defined as a first imaginary straight line L1a, and a straight line extending from the inner tube center axis A5, passing through the other end portion of the combustion product discharge region R1a in the circumferential direction, and intersecting with the peripheral wall portion 11 is defined as a second imaginary straight line L2a. Similarly, as viewed in the axial direction of the surrounding wall portion 51, a straight line extending from the inner tube center axis A5, passing through one end portion of the combustion product discharge region R1b in the circumferential direction and intersecting the peripheral wall portion 11, is defined as a first imaginary straight line L1b, and a straight line extending from the inner tube center axis A5, passing through the other end portion of the combustion product discharge region R1b in the circumferential direction and intersecting the peripheral wall portion 11, is defined as a second imaginary straight line L2b. That is, the surrounding wall portion 51 is divided by the first imaginary straight line L1a, the second imaginary straight line L2a, the first imaginary straight line L1b, and the second imaginary straight line L2b. More specifically, in the surrounding wall portion 51, a region between the first imaginary straight line L1a and the second imaginary straight line L2a is the combustion product discharge region R1a, a region between the first imaginary straight line L1b and the second imaginary straight line L2b is the combustion product discharge region R1b, a region between the first imaginary straight line L1a and the first imaginary straight line L1b is the combustion product non-discharge region R2a, and a region between the second imaginary straight line L2a and the second imaginary straight line L2b is the combustion product non-discharge region R2b.

Gas Discharge Port

As illustrated in FIG. 2, the peripheral wall portion 11 of the housing 1 is divided by the first imaginary straight line L1a, the second imaginary straight line L2a, the first imaginary straight line L1b, and the second imaginary straight line L2b into communication hole-associated regions R10a and R10b and communication hole non-associated regions R20a and R20b in the circumferential direction of the peripheral wall portion 11. As viewed in the axial direction of the surrounding wall portion 51, a range of the communication hole-associated region R10a is defined by the first imaginary straight line L1a and the second imaginary straight line L2a, a range of the communication hole-associated region R10b is defined by the first imaginary straight line L1b and the second imaginary straight line L2b, a range of the communication hole non-associated region R20a is defined by the first imaginary straight line L1a and the first imaginary straight line L1b, and a range of the communication hole non-associated region R20b is defined by the second imaginary straight line L2a and the second imaginary straight line L2b. Thus, as illustrated in FIG. 2, the combustion product discharge region R1a and the communication hole-associated region R10a face each other, the combustion product discharge region R1b and the communication hole-associated region R10b face each other, the combustion product non-discharge region R2a and the communication hole non-associated region R20a face each other, and the combustion product non-discharge region R2b and the communication hole non-associated region R20b face each other in the radiation direction with the inner tube center axis A5, which is the center axis of the surrounding wall portion 51, as the center. That is, in the gas generator 100, the combustion product discharge region R1a is associated with the communication hole-associated region R10a, the combustion product discharge region R1b is associated with the communication hole-associated region R10b, the combustion product non-discharge region R2a is associated with the communication hole non-associated region R20a, and the combustion product non-discharge region R2b is associated with the communication hole non-associated region R20b.

As illustrated in FIG. 2, the plurality of gas discharge ports 12 formed in the peripheral wall portion 11 of the housing 1 include first gas discharge ports 12a and second gas discharge ports 12b having different opening pressures. The second gas discharge ports 12b are configured to have higher opening pressures than the first gas discharge ports 12a. That is, the second gas discharge ports 12b are configured to be more difficult to open than the first gas discharge ports 12a. Specifically, the cross-sectional area (port diameter) of each second gas discharge port 12b is made smaller than the cross-sectional area (port diameter) of each first gas discharge port 12a. During the combustion of the first gas generating agent 110 and the second gas generating agent 120, a load acts on the seal tape 13 due to the pressure of the combustion gas. At this time, since the cross-sectional area of each second gas discharge port 12b is smaller than the cross-sectional area of each first gas discharge port 12a, the load acting on the part of the seal tape 13 that closes the second gas discharge ports 12b is smaller than the load acting on the part of the seal tape 13 that closes the first gas discharge ports 12a. Accordingly, the second gas discharge ports 12b have higher opening pressures than the first gas discharge ports 12a and are more difficult to open.

As illustrated in FIG. 2, of the communication hole-associated regions R10a and R10b and the communication hole non-associated regions R20a and R20b, the first gas discharge ports 12a are formed only in the communication hole-associated regions R10a and R10b, and the second gas discharge ports 12b are formed only in the communication hole non-associated regions R20a and R20b. That is, in the communication hole-associated region R10a and the communication hole-associated region R10b facing the combustion product discharge region R1a and the combustion product discharge region R1b in which the communication holes h1 are disposed, the second gas discharge ports 12b having high opening pressures are not formed, and only the first gas discharge ports 12a having low opening pressures are formed.

Operation

A basic operation of the gas generator 100 according to the first embodiment will be described below with reference to FIG. 1. In this example, a case in which the second ignition device 7 is activated following the first ignition device 4 (that is, after the first ignition device 4 is activated) will be described.

When a sensor (not illustrated) senses an impact, an ignition current is supplied to the first igniter 41 of the first ignition device 4 and the first igniter 41 is activated. Then, the ignition charge accommodated in the first igniter 41 is burned, and a flame, high-temperature gas, and the like, which are combustion products of the ignition charge, are discharged to the inside of the ignition unit chamber 53. Thus, the transfer charge 6 accommodated in the ignition unit chamber 53 is burned, and combustion gas is generated in the ignition unit chamber 53. When the seal tape closing the communication holes h1 of the surrounding wall portion 51 is broken by the pressure of the combustion gas of the transfer charge 6, the combustion gas is discharged to the outside of the ignition unit chamber 53 through the communication holes h1. Then, the combustion gas of the transfer charge 6 comes into contact with the first gas generating agent 110 disposed around the surrounding wall portion 51, and the first gas generating agent 110 is ignited. When the first gas generating agent 110 is burned, high-temperature and high-pressure combustion gas is generated in the first combustion chamber 10. When this combustion gas passes through the filter 9, the combustion gas is cooled, and the combustion residue is filtered. The combustion gas of the first gas generating agent 110 cooled and filtered by the filter 9 breaks the seal tape 13 closing the gas discharge ports 12 and is discharged from the gas discharge ports 12 to the outside of the housing 1.

Subsequently, when the second igniter 71 of the second ignition device 7 is activated, the second gas generating agent 120 accommodated in the second combustion chamber 20 is burned, and combustion gas is generated in the second combustion chamber 20. When the seal tape closing the communication holes h2 of the surrounding wall portion 81 is broken by the pressure of the combustion gas of the second gas generating agent 120, the combustion gas is discharged to the first combustion chamber 10 through the communication holes h2. After being cooled and filtered by the filter 9, the combustion gas of the second gas generating agent 120 is discharged from the gas discharge ports 12 to the outside of the housing 1.

The combustion gases of the first gas generating agent 110 and the second gas generating agent 120 flow into an airbag (not illustrated) after being discharged to the outside of the housing 1. This causes the airbag to inflate, forming a cushion between the occupant and the rigid structure and protecting the occupant from the impact.

Correspondence Between Communication Hole and Gas Discharge Port

In general, the combustion performance of the gas generating agent tends to improve as the temperature or pressure around the gas generating agent increases. That is, in a low-temperature and low-pressure environment, the gas generating agent is inactively burned. Thus, to reduce the difference between the output performance of the gas generator during activation at a high temperature (hereinafter referred to as "high-temperature activation") and the output performance of the gas generator during activation at a low temperature (hereinafter referred to as "low-temperature activation") and to stabilize the output performance, it is necessary to increase the internal pressure of the housing during the low-temperature activation and improve the combustion performance of the gas generating agent. In the gas generator 100, when the communication holes h1, the first gas discharge ports 12a, and the second gas discharge ports 12b are disposed as described above, the internal pressure of the housing during the low-temperature activation can be increased and the difference between the combustion performance of the gas generating agent during the low-temperature activation and the combustion performance of the gas generating agent during the high-temperature activation can be reduced. This will be described in detail below.

Figure 3:
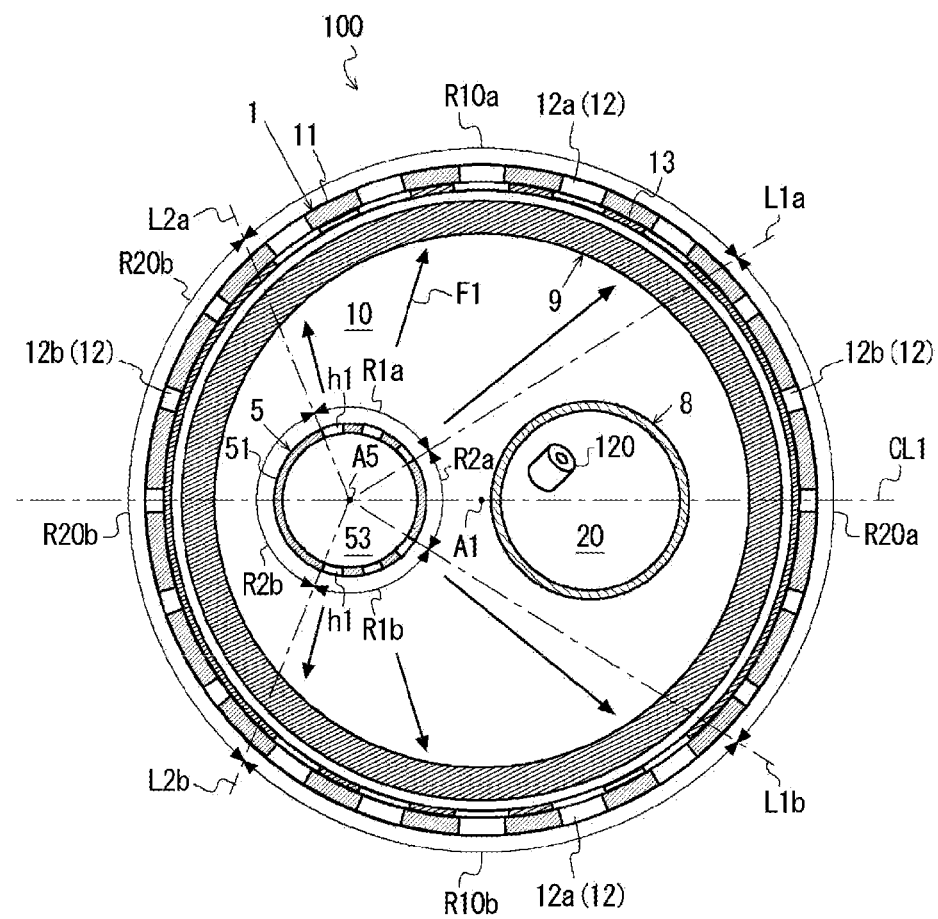
FIG. 3 is a transverse cross-sectional view illustrating a state of the gas generator during low-temperature activation.
Figure 4:
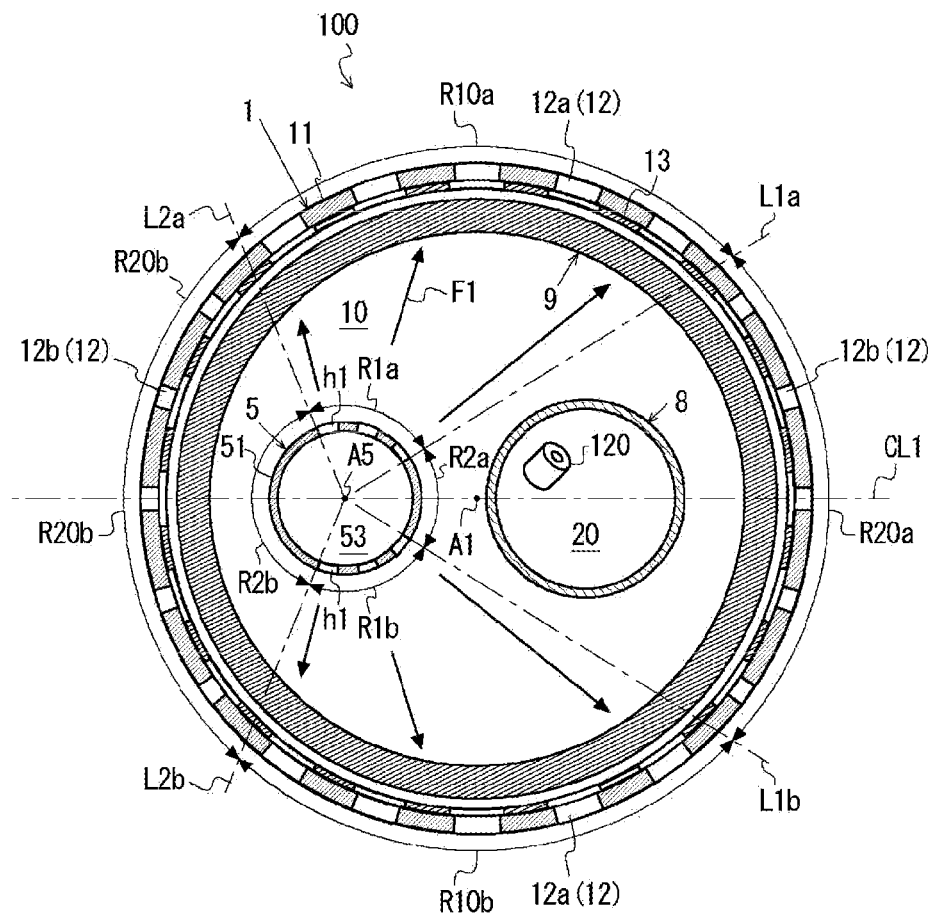
FIG. 4 is a transverse cross-sectional view illustrating a state of the gas generator during high-temperature activation.

FIG. 3 is a transverse cross-sectional view illustrating a state of the gas generator 100 during the low-temperature activation. FIG. 4 is a transverse cross-sectional view illustrating a state of the gas generator 100 during the high-temperature activation. FIGS. 3 and 4 illustrate cross sections corresponding to FIG. 2. As illustrated in FIGS. 3 and 4, the gas generator 100 is configured such that, of the plurality of gas discharge ports 12, only the first gas discharge ports 12a having low opening pressures are opened during the low-temperature activation, and the second gas discharge ports 12b having high opening pressures are opened together with the first gas discharge ports 12a during the high-temperature activation. In the gas generator 100, since only the first gas discharge ports 12a are opened during the low-temperature activation, the combustion gas is more likely to be trapped inside the housing 1 (the first combustion chamber 10) while the combustion gas is also discharged from the first gas discharge ports 12a than when all the gas discharge ports 12 are opened at the same temperature. This increases the internal pressure of the housing 1 during the low-temperature activation and improves the combustion performance of the gas generating agent. On the other hand, during the high-temperature activation in which the combustion performance of the gas generating agent is expected to be high from the beginning, both the first gas discharge ports 12a and the second gas discharge ports 12b are opened to discharge the combustion gas, which suppresses an excessive increase in the internal pressure of the housing 1. In this way, by improving the combustion performance of the gas generating agent during the low-temperature activation in the gas generator 100, the difference between the output performance of the gas generator during the high-temperature activation and the output performance of the gas generator during the low-temperature activation is reduced, which stabilizes the output performance.

Arrows denoted by a reference sign F1 in FIGS. 3 and 4 indicate the traveling directions of the combustion product discharged from the communication holes h1. As illustrated in FIGS. 3 and 4, the combustion product discharged from the ignition unit chamber 53 through the communication holes h1 by the activation of the first ignition device 4 is discharged radially with the inner tube center axis A5, which is the center axis of the surrounding wall portion 51, as a center. That is, the combustion product is discharged toward the communication hole-associated regions R10a and R10b that are regions facing the combustion product discharge regions R1a and R1b in the radiation direction with the inner tube center axis A5 as a center. Thus, the first gas generating agent 110 disposed in the first combustion chamber 10 is sequentially ignited from a part disposed close to the combustion product discharge regions R1a and R1b toward a part disposed close to the communication hole-associated regions R10a and R10b. As a result, most of the combustion gas of the first gas generating agent 110 flows radially from the combustion product discharge regions R1a and R1b and collides with the communication hole-associated regions R10a and R10b.

If the second gas discharge ports 12b are formed in the communication hole-associated region R10a and the communication hole-associated region R10b, the second gas discharge ports 12b may be opened due to the pressure of the combustion gas colliding with the communication hole-associated region R10a and the communication hole-associated region R10b even during the low-temperature activation. In this case, since the second gas discharge ports 12b are opened in addition to the first gas discharge ports 12a, the internal pressure of the housing may not be as high as expected. On the other hand, if the first gas discharge ports 12a are formed in the communication hole non-associated region R20a and the communication hole non-associated region R20b, the first gas discharge ports 12a may not be opened during the low-temperature activation. In this case, since the number of the first gas discharge ports 12a that are opened is insufficient, the internal pressure of the housing may be excessively high. In either case, the combustion performance of the gas generating agent cannot be obtained as expected, and it is difficult to stabilize the output performance.

On the other hand, in the peripheral wall portion 11 of the gas generator 100, the first gas discharge ports 12a are formed only in the communication hole-associated regions R10a and R10b facing the combustion product discharge regions R1a and Rib, and the second gas discharge ports 12b are formed only in the communication hole non-associated regions R20a and R20b not facing the combustion product discharge regions R1a and R1b. Thus, during the low-temperature activation, the first gas discharge ports 12a are more easily opened, and the second gas discharge ports 12b are less likely to open. Thus, during the low-temperature activation, among the first gas discharge ports 12a and the second gas discharge ports 12b, it is possible to more reliably open only the first gas discharge ports 12a. This can reliably increase the internal pressure of the housing and the combustion performance of the gas generating agent during the low-temperature activation. As a result, the difference between the output performance of the gas generator 100 during the low-temperature activation and the output performance of the gas generator 100 during the high-temperature activation can be reduced and the output performance can be stabilized.

Actions and Effects

As described above, in the gas generator 100, the plurality of gas discharge ports 12 include the first gas discharge ports 12a and the second gas discharge ports 12b having higher opening pressures than the first gas discharge ports 12a, and the surrounding wall portion 51 of the first inner tube member 5 is divided, in the circumferential direction of the surrounding wall portion 51, into the combustion product discharge regions R1a and R1b in which the plurality of communication holes h1 are collectively disposed and the combustion product non-discharge regions R2a and R2b that are regions of the surrounding wall portion 51 other than the combustion product discharge regions R1a and R1b. The peripheral wall portion 11 of the housing 1 is divided, in the circumferential direction of the peripheral wall portion 11, into the communication hole-associated regions R10a and R10b associated with the combustion product discharge regions R1a and R1b and the communication hole non-associated regions R20a and R20b associated with the combustion product non-discharge regions R2a and R2b. The first gas discharge ports 12a are formed only in the communication hole-associated regions R10a and R10b, and the second gas discharge ports 12b are formed only in the communication hole non-associated regions R20a and R20b. With this gas generator 100, since the first gas discharge ports 12a are formed only in the communication hole-associated regions R10a and R10b, the first gas discharge ports 12a are more easily opened, and since the second gas discharge ports 12b are formed only in the communication hole non-associated regions R20a and R20b, the second gas discharge ports 12b are more difficult to open. This makes it possible to more reliably open only the first gas discharge ports 12a during the low-temperature activation. As a result, as described above, the difference between the output performance during the low-temperature activation and the output performance during the high-temperature activation can be reduced and output performance of the gas generator 100 can be stabilized.

In addition, in the peripheral wall portion 11 of the gas generator 100, the first gas discharge ports 12a and the second gas discharge ports 12b are disposed in separate regions (the communication hole-associated regions R10a and R10b and the communication hole non-associated regions R20a and R20b). Thus, the second gas discharge ports 12b are hardly affected by the combustion gas flowing to the first gas discharge ports 12a. This can make it more difficult to open the second gas discharge ports 12b during the low-temperature activation. In the circumferential direction of the peripheral wall portion 11, the distance between the first gas discharge port 12a and the second gas discharge port 12b adjacent to each other may be set larger than the distance between the adjacent first gas discharge ports 12a in the communication hole-associated regions R10a and R10b and the distance between the adjacent second gas discharge ports 12b in the communication hole non-associated regions R20a and R20b.

In addition, in the gas generator 100, the communication hole-associated regions R10a and R10b are formed as regions of the peripheral wall portion 11 that face the combustion product discharge regions R1a and R1b in the radiation direction with the inner tube center axis A5 as a center. Thus, the communication hole-associated regions R10a and R10b are associated with the combustion product discharge regions R1a and R1b.

Furthermore, in the gas generator 100, as viewed in the axial direction of the surrounding wall portion 51, ranges of the communication hole-associated regions R10a and R10b are defined by the first imaginary straight lines L1a and L1b and the second imaginary straight lines L2a and L2b. Thus, the communication hole-associated regions R10a and R10b are defined as regions facing the combustion product discharge regions R1a and R1b in the radiation direction with the inner tube center axis A5 as a center.

Furthermore, in the gas generator 100, the inner tube center axis A5, which is the center axis of the surrounding wall portion 51, and the housing center axis A1, which is the center axis of the peripheral wall portion 11, are spaced apart from each other. That is, the first inner tube member 5 is disposed eccentrically with respect to the center of the housing 1. In addition, the surrounding wall portion 51 includes the combustion product discharge regions R1a and R1b located line-symmetrically with the imaginary center line CL1 as an axis of symmetry, as viewed in the axial direction. The peripheral wall portion 11 includes the communication hole-associated region R10a associated with the combustion product discharge region R1a and the communication hole-associated region R10b associated with the combustion product discharge region R1b. Further, in the combustion product discharge regions R1a and R1b, the communication holes h1 are formed and disposed line-symmetrically with the imaginary center line CL1 as an axis of symmetry, and in the communication hole-associated regions R10a and R10b, the first gas discharge ports 12a are formed and disposed line-symmetrically with the imaginary center line CL1 as an axis of symmetry. That is, in the gas generator 100, the communication holes h1 and the first gas discharge ports 12a are arranged line-symmetrical with the imaginary center line CL1 as an axis of symmetry. With this configuration, since the communication hole-associated region R10a and the communication hole-associated region R10b are located line-symmetrically, when only the first gas discharge ports 12a are opened during the low-temperature activation, thrust of the combustion gas discharged from the first gas discharge ports 12a of the communication hole-associated region R10a and thrust of the combustion gas discharged from the first gas discharge ports 12a of the communication hole-associated region R10b cancel out each other. As a result, the balance of the gas generator 100 during the activation becomes stable.

Furthermore, in the gas generator 100, the opening pressures of the first gas discharge ports 12a formed in the communication hole-associated region R10a and the opening pressures of the first gas discharge ports 12a formed in the communication hole-associated region R10b that is line-symmetrical to the communication hole-associated region R10a are equal to each other. Since the first gas discharge ports 12a located line-symmetrically to each other have the same opening pressures, the positions of the first gas discharge ports 12a opened during the low-temperature activation become symmetrical. As a result, the balance of the gas generator 100 during the activation becomes more stable. In addition, in the gas generator 100, the second gas discharge ports 12b formed in the communication hole non-associated regions R20a and R20b are also disposed symmetrically with respect to the imaginary center line CL1, and thus the balance of the gas generator 100 during the activation becomes more stable.

The combustion product discharge region R1a corresponds to a "first combustion product discharge region" according to the present disclosure, the combustion product discharge region R1b corresponds to a "second combustion product discharge region" according to the present disclosure, the communication hole-associated region R10a corresponds to a "first communication hole-associated region" according to the present disclosure, and the communication hole-associated region R10b corresponds to a "second communication hole-associated region" according to the present disclosure.

As illustrated in FIGS. 2 to 4, the second inner tube member 8 in which the second gas generating agent 120 is formed is disposed at a position not between the combustion product discharge region R1a and the communication hole-associated region R10a or between the combustion product discharge region R1b and the communication hole-associated region R10b in the radiation direction with the inner tube center axis A5 as a center. That is, the second inner tube member 8 is disposed at a position not obstructing flows of the combustion gas of the first gas generating agent 110 from the combustion product discharge regions R1a and R1b toward the communication hole-associated regions R10a and R10b. This makes it possible to more reliably open the first gas discharge ports 12a formed in the communication hole-associated regions R10a and R10b.

In this example, the cross-sectional area (port diameter) of the first gas discharge port 12a and the cross-sectional area (port diameter) of the second gas discharge port 12b are different from each other, and thus the opening pressures of the first gas discharge port 12a and the second gas discharge port 12b are different from each other. However, the present disclosure is not limited thereto. For example, the opening pressure of the second gas discharge port may be made higher than the opening pressure of the first gas discharge port by partially adjusting the strength of the closing member that closes the gas discharge ports and making the strength of the part that closes the second gas discharge ports higher than the strength of the part that closes the first gas discharge ports. In addition, the opening pressure may be adjusted by changing both the port diameter of each gas discharge port and the strength of the closing member closing the gas discharge port. Note that examples of the adjustment for strength of the closing member include adjustment of the material of the closing member and adjustment of the thickness of the closing member including pasting the closing member in an overlapping manner.

Further, in this example, the plurality of (three) communication holes h1 are disposed in each of the combustion product discharge regions R1a and R1b, but the number of the communication holes disposed in each combustion product discharge region according to the present disclosure is not particularly limited. The combustion product discharge regions may each be provided with only one communication hole instead of the plurality of communication holes. Further, in the present disclosure, the number and arrangement of the communication holes in the surrounding wall portion are not limited to those illustrated in FIG. 2 and the like. In the above-described example, the communication holes h1 may be formed at portions other than the combustion product discharge region R1a or the combustion product discharge region R1b. In addition, the number of the communication holes formed in the surrounding wall portion is not limited to a plurality and may be only one.

In the present example, the transfer charge 6 is accommodated in the ignition unit chamber 53. However, the gas generator of the present disclosure may be configured to ignite the first gas generating agent by increasing the type or amount of the ignition charge of the first igniter 41 without using the transfer charge 6. That is, the gas generator according to the present disclosure is only required to be configured to discharge the combustion product from the ignition unit chamber through the communication holes by the activation of the first ignition device, and the "combustion product" discharged from the communication holes to ignite the first gas generating agent in the present disclosure is not limited to the combustion product of the transfer charge and may be a combustion product of the ignition charge. Further, a component obtained by integrating the transfer charge with the first igniter 41 may be used as the first ignition device.

Modified Examples of First Embodiment

A gas generator according to a modified example of the first embodiment will be described below. In the description of the modified examples, differences from the gas generator 100 described with reference to FIGS. 1 to 4 will be mainly described, and the same points as those of the gas generator 100 will be denoted by the same reference signs, and detailed description will be omitted.

First Modified Example of First Embodiment

Figure 5:
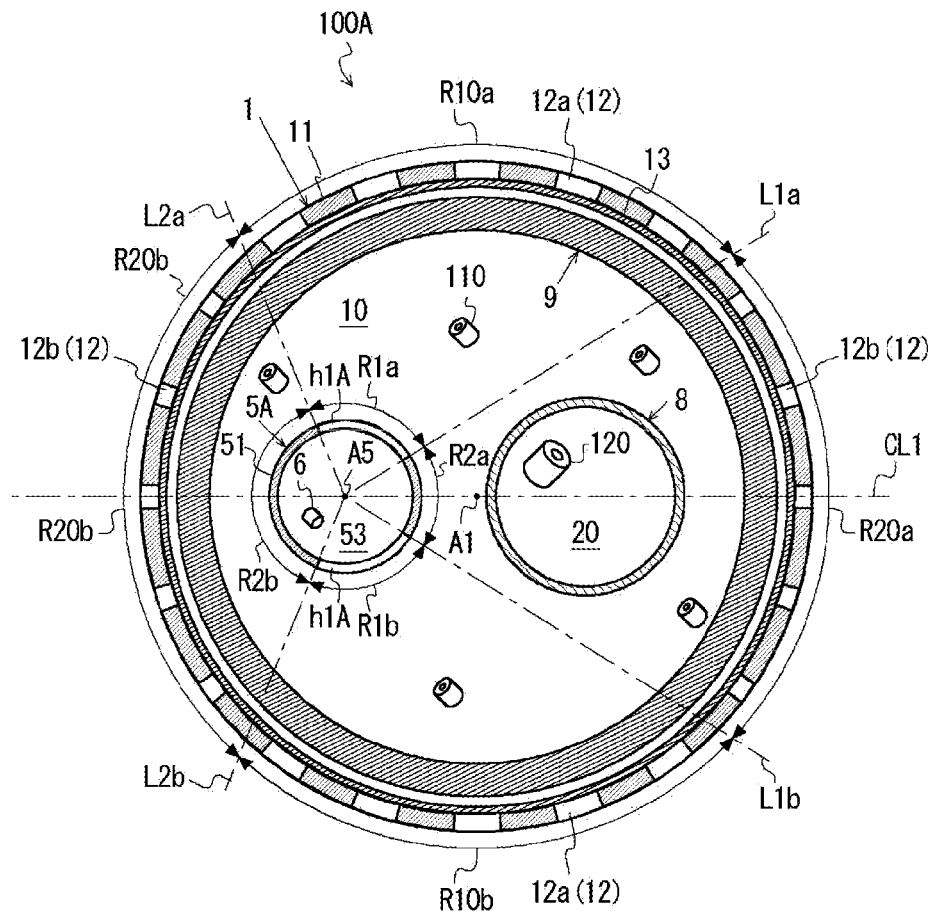
FIG. 5 is a transverse cross-sectional view of a gas generator according to a first modified example of the first embodiment.
Figure 6:
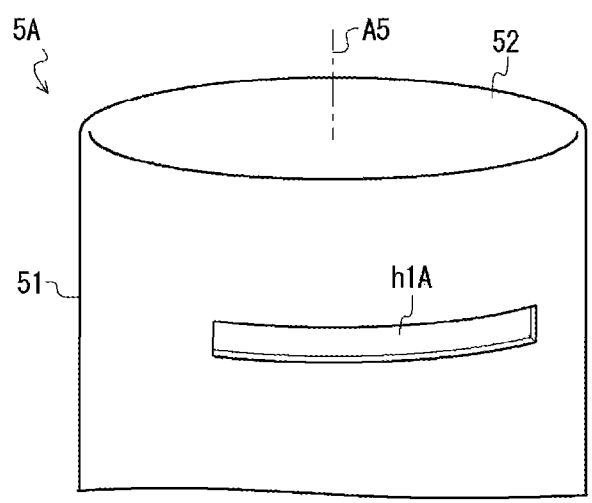
FIG. 6 is a perspective view of a first inner tube member according to the first modified example of the first embodiment.

FIG. 5 is a transverse cross-sectional view of a gas generator 100A according to a first modified example of the first embodiment. FIG. 5 illustrates a state of the gas generator 100A before activation. FIG. 6 is a perspective view of a first inner tube member 5A according to the first modified example of the first embodiment. As illustrated in FIGS. 5 and 6, in the gas generator 100A, one communication hole h1A is disposed in each of the combustion product discharge regions R1a and R1b. The communication hole h1A is formed as a single hole extending in the circumferential direction of the surrounding wall portion 51 over the combustion product discharge region R1a and the combustion product discharge region R1b.

The gas generator 100A illustrated in FIG. 5 can also stabilize the output performance in the same manner as the above-described gas generator 100. Further, according to the gas generator 100A, since the communication hole h1A is formed in the entire region of the combustion product discharge regions R1a and R1b, the combustion product radially discharged from the ignition unit chamber 53 through the communication hole h1A is uniformly discharged toward the entire regions of the communication hole-associated regions R10a and R10b facing the combustion product discharge regions R1a and R1b. This enables the combustion gas of the first gas generating agent 110 to uniformly collide with the communication hole-associated regions R10a and R10b and enables the first gas discharge ports 12a formed in the communication hole-associated regions R10a and R10b to be more reliably opened.

Second Modified Example of First Embodiment

Figure 7:
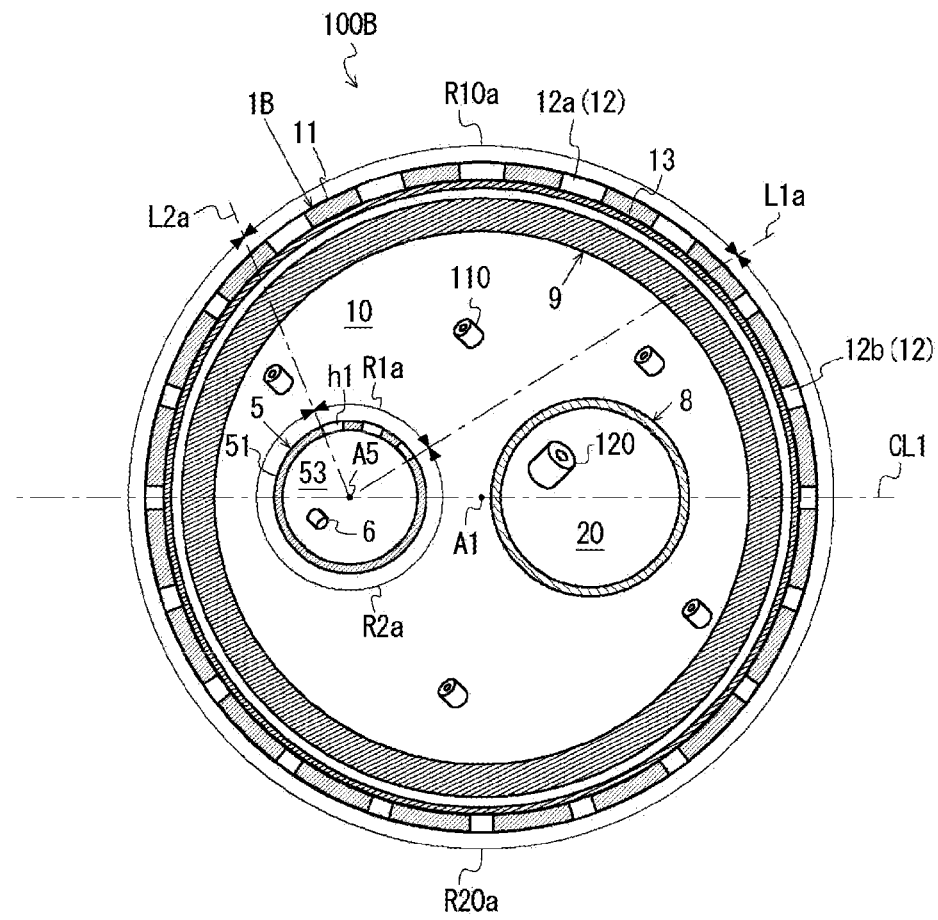
FIG. 7 is a transverse cross-sectional view of a gas generator according to a second modified example of the first embodiment.

FIG. 7 is a transverse cross-sectional view of a gas generator 100B according to a second modified example of the first embodiment. FIG. 7 illustrates a state of the gas generator 100B before activation. As illustrated in FIG. 7, the gas generator 100B does not include the combustion product discharge region R1b and the communication hole-associated region R10b corresponding to the combustion product discharge region R1b. In this regard, the gas generator 100B is different from the gas generator 100. That is, in the gas generator 100B, the communication holes h1 and the gas discharge ports 12 are disposed asymmetrically with the imaginary center line CL1 as an axis of symmetry. As exemplified by the gas generator 100B, in the gas generator according to the present disclosure, the communication holes and the gas discharge ports may not be disposed at line-symmetrical positions with an imaginary center line as an axis of symmetry. The gas generator 100B illustrated in FIG. 7 can also stabilize the output performance in the same manner as the above-described gas generator 100.

Second Embodiment

Figure 8:
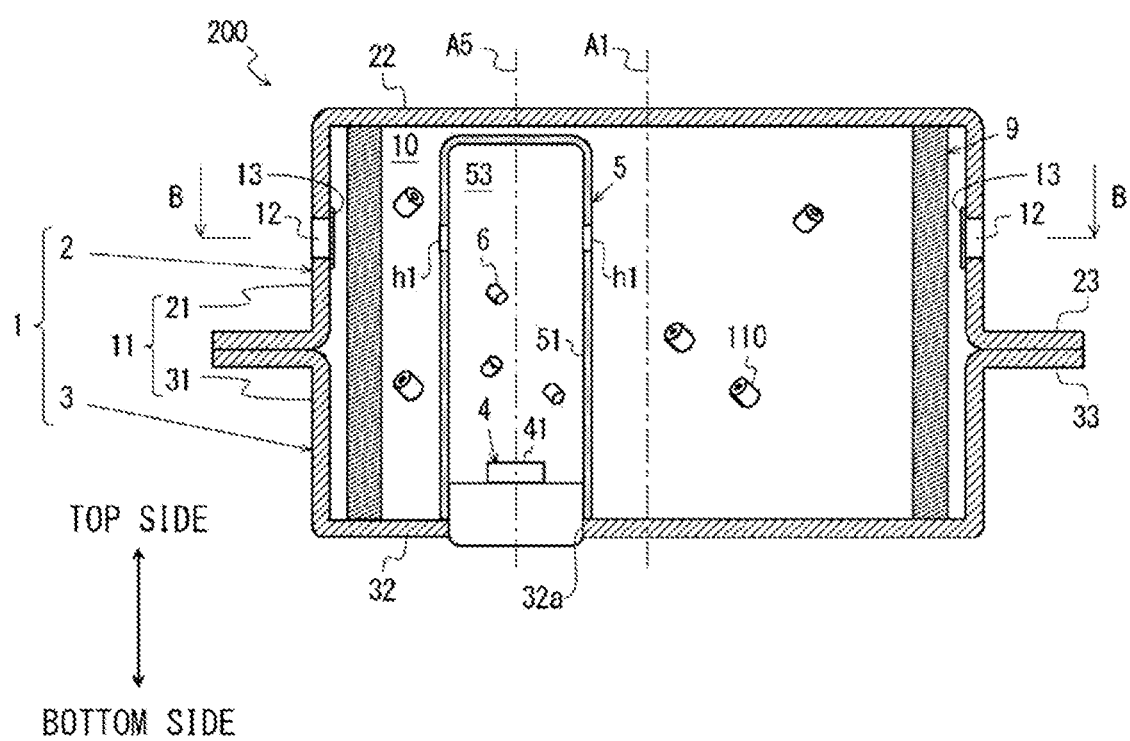
FIG. 8 is a longitudinal cross-sectional view of a gas generator according to a second embodiment.
Figure 9:
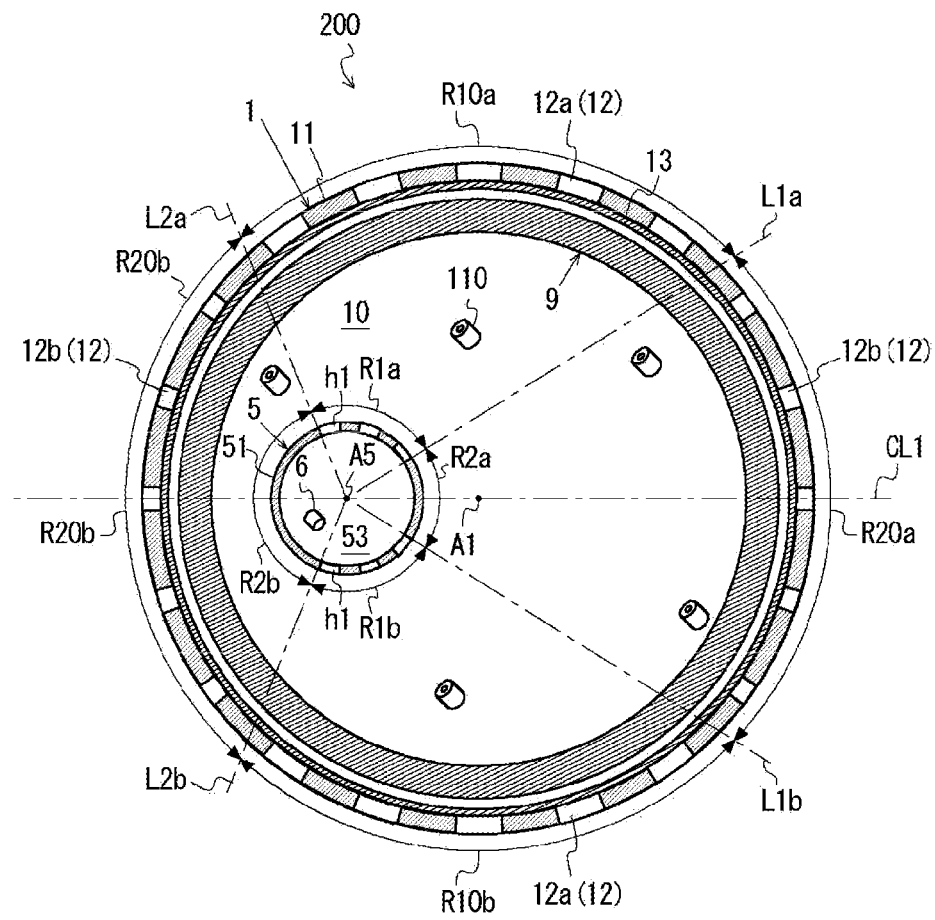
FIG. 9 is a cross-sectional view taken along line B-B of FIG. 8.

Hereinafter, a gas generator according to a second embodiment will be described focusing on differences from the gas generator 100, and the same points as those of the gas generator 100 will be denoted by the same reference signs and a detailed description will be omitted. FIG. 8 is a longitudinal cross-sectional view of a gas generator 200 according to the second embodiment. FIG. 9 is a cross-sectional view taken along line B-B of FIG. 8. FIGS. 8 and 9 illustrate a state of the gas generator 200 before activation.

As illustrated in FIGS. 8 and 9, the gas generator 200 according to the second embodiment does not include the second ignition device 7, the second inner tube member 8, the second gas generating agent 120, or the second combustion chamber 20. In this regard, the gas generator 200 is different from the gas generator 100 according to the first embodiment. That is, the gas generator 200 is configured as a so-called single-type gas generator including only one ignition device located at a position deviated from the housing center axis A1. In the same manner as the gas generator 100 according to the first embodiment, the gas generator 200 illustrated in FIGS. 8 and 9 can also stabilize the output performance.

First Modified Example of Second Embodiment

Figure 10:
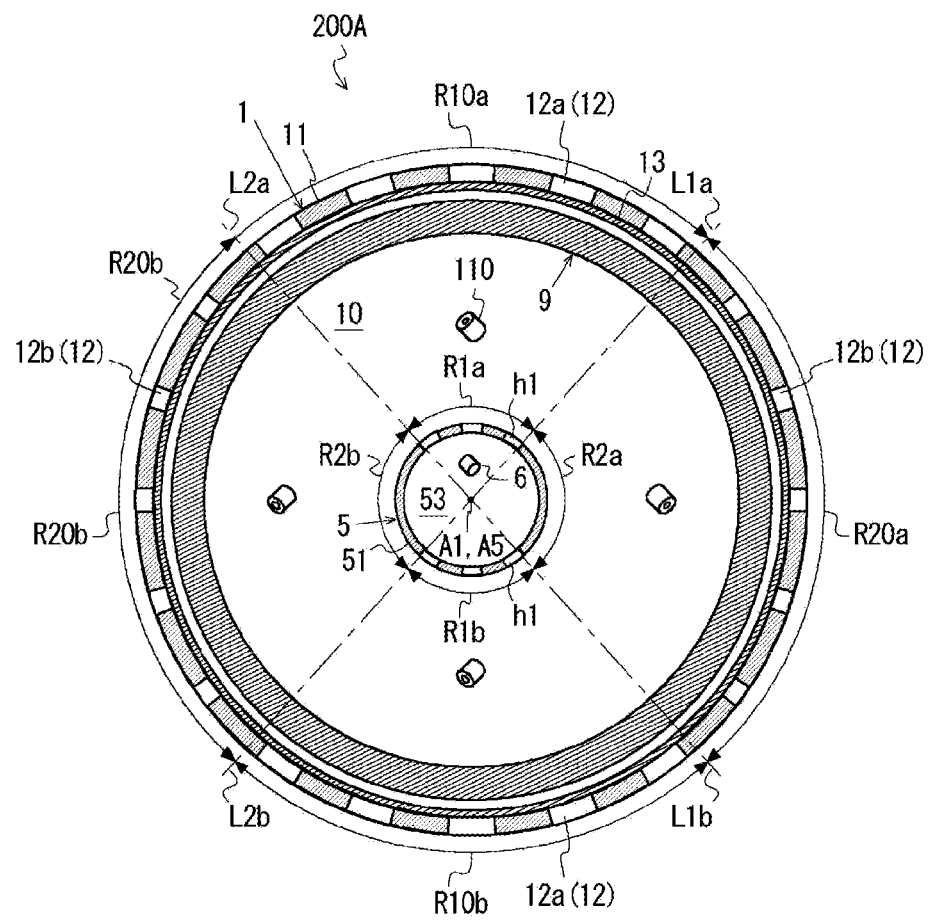
FIG. 10 is a transverse cross-sectional view of a gas generator according to a first modified example of the second embodiment.

FIG. 10 is a transverse cross-sectional view of a gas generator 200A according to a first modified example of the second embodiment. FIG. 10 illustrates a state of the gas generator 200A before activation. As illustrated in FIG. 10, in the gas generator 200A, the inner tube center axis A5 coincides with the housing center axis A1, that is, the gas generator 200A is a single-type gas generator in which the first inner tube member 5 is disposed at the center of the housing 1 and there is no member accompanying the second combustion chamber. In this regard, the gas generator 200A is different from the gas generator 200. In the same manner as the gas generator 100 according to the first embodiment, the gas generator 200A illustrated in FIG. 10 can also stabilize the output performance.

Further, as illustrated in FIG. 10, the gas generator 200A is formed point-symmetrically as viewed in the axial direction. Specifically, the combustion product discharge region R1a and the combustion product discharge region R1b are located point-symmetrically with the housing center axis A1 (the inner tube center axis A5) as a center of symmetry, and the communication hole-associated region R10a and the communication hole-associated region R10b are located point-symmetrically with the housing center axis A1 as a center of symmetry. Further, the communication holes h1 are formed in the combustion product discharge regions R1a and R1b and disposed point-symmetrically with the housing center axis A1 as a center of symmetry, and the first gas discharge ports 12a are formed in the communication hole-associated regions R10a and R10b and disposed point-symmetrically with the housing center axis A1 as a center of symmetry. With this configuration, since the communication hole-associated region R10a and the communication hole-associated region R10b are located point-symmetrically, when only the first gas discharge ports 12a are opened during the low-temperature activation, thrust of the combustion gas discharged from the first gas discharge ports 12a of the communication hole-associated region R10a and thrust of the combustion gas discharged from the first gas discharge ports 12a of the communication hole-associated region R10b cancel out each other. As a result, the balance of the gas generator 100 during the activation becomes stable.

Other

Suitable embodiments according to the present disclosure have been described above, but each embodiment disclosed in the present specification can be combined with each of features disclosed in the present specification.

REFERENCE SIGNS LIST 100, 200 Gas generator
1 Housing
11 Peripheral wall portion
12 Gas discharge port
12a First gas discharge port
12b Second gas discharge port
4 First ignition device
5 First inner tube member
51 Surrounding wall portion
53 Ignition unit chamber
6 Transfer charge
7 Second ignition device
8 Second inner tube member
10 First combustion chamber
20 Second combustion chamber
110 First gas generating agent
120 Second gas generating agent
h1 Communication hole
A1 Housing center axis
A5 Inner tube center axis
R1a, R1b Combustion product discharge region
R2a, R2b Combustion product non-discharge region
R10a, R10b Communication hole-associated region
R20a, R20b Communication hole non-associated region

The invention claimed is:

1. A gas generator comprising:
a first ignition device;
a first combustion chamber in which the first ignition device is disposed;
a housing including a peripheral wall portion having a tubular shape, a top plate portion provided at one end of the peripheral wall portion, and a bottom plate portion provided at another end of the peripheral wall portion and facing the top plate portion, the bottom plate portion defining the first combustion chamber together with the peripheral wall portion and the top plate portion, the first ignition device being fixed to the bottom plate portion;
a first inner tube member including a surrounding wall portion that has a tubular shape and surrounds the first ignition device, the first inner tube member forming an ignition unit chamber between the first inner tube member and the first ignition device, the first inner tube member including one or a plurality of communication holes formed in the surrounding wall portion, the one or plurality of communication holes allowing the ignition unit chamber and an outside of the first inner tube member to communicate with each other;
a first gas generating agent disposed in the first combustion chamber and surrounding the surrounding wall portion, the first gas generating agent being configured to be burned by a combustion product discharged from the ignition unit chamber through the one or plurality of communication holes by activation of the first ignition device; and
a plurality of gas discharge ports formed in the housing, the plurality of gas discharge ports allowing the first combustion chamber and an outside of the housing to communicate with each other by opening upon receiving a combustion pressure of the first gas generating agent, wherein the plurality of gas discharge ports include a first gas discharge port and a second gas discharge port, the second gas discharge port having an opening pressure higher than an opening pressure of the first gas discharge port,
the surrounding wall portion is divided, in a circumferential direction of the surrounding wall portion, into a combustion product discharge region in which the one communication hole is disposed or the plurality of communication holes are collectively disposed and a combustion product non-discharge region being a region other than the combustion product discharge region,
the peripheral wall portion is divided, in a circumferential direction of the peripheral wall portion, into a communication hole-associated region associated with the combustion product discharge region and a communication hole non-associated region associated with the combustion product non-discharge region,
of the communication hole-associated region and the communication hole non-associated region, the first gas discharge port is formed only in the communication hole-associated region, and the second gas discharge port is formed only in the communication hole non-associated region, and
a range of the communication hole-associated region is defined by a first imaginary straight line extending from a center axis of the surrounding wall portion, passing through one end portion of the combustion product discharge region in the circumferential direction of the surrounding wall portion and intersecting the peripheral wall portion, and a second imaginary straight line extending from the center axis of the surrounding wall portion, passing through another end portion of the combustion product discharge region in the circumferential direction of the surrounding wall portion and intersecting the peripheral wall portion, as viewed in an axial direction of the surrounding wall portion.

2. The gas generator according to claim 1, wherein
in the peripheral wall portion, the communication hole-associated region is a region facing the combustion product discharge region in a radiation direction with a center axis of the surrounding wall portion as a center.

3. The gas generator according to claim 1, wherein
a center axis of the surrounding wall portion and a center axis of the peripheral wall portion are spaced apart,
the surrounding wall portion includes a first combustion product discharge region and a second combustion product discharge region, the first combustion product discharge region and the second combustion product discharge region being the combustion product discharge regions located line-symmetrically to each other with an imaginary center line passing through the center axis of the surrounding wall portion and the center axis of the peripheral wall portion as an axis of symmetry, as viewed in the axial direction of the surrounding wall portion,
the peripheral wall portion includes a first communication hole-associated region and a second communication hole-associated region, the first communication hole-associated region being the communication hole-associated region associated with the first combustion product discharge region, and the second communication hole-associated region being the communication hole-associated region associated with the second combustion product discharge region, the one or plurality of communication holes are formed and disposed line-symmetrically with the imaginary center line as an axis of symmetry in each of the first combustion product discharge region and the second combustion product discharge region, and the first gas discharge port is formed and disposed line-symmetrically with the imaginary center line as an axis of symmetry in each of the first communication hole-associated region and the second communication hole-associated region.

4. The gas generator according to claim 3, wherein an opening pressure of the first gas discharge port formed in the first communication hole-associated region and an opening pressure of the first gas discharge port formed in the second communication hole-associated region are equal to each other.

5. The gas generator according to claim 1, further comprising:
a second ignition device;
a second gas generating agent configured to be burned by activation of the second ignition device;
a second combustion chamber in which the second ignition device and the second gas generating agent are disposed; and
a second inner tube member having a tubular shape and being disposed in the housing, the second combustion chamber being formed in the second inner tube member, wherein
the second inner tube member is disposed at a position not between the combustion product discharge region and the communication hole-associated region in a radiation direction with a center axis of the surrounding wall portion as a center.

6. The gas generator according to claim 1, wherein
the one or plurality of communication holes are formed as a single hole extending in the circumferential direction of the surrounding wall portion over the combustion product discharge region.

7. A gas generator comprising:
a first ignition device;
a first inner tube member forming an ignition unit chamber including therein the first ignition device and including a surrounding wall portion provided with one or a plurality of communication holes, the surrounding wall portion including, in a circumferential direction thereof,
a combustion product discharge region in which the one communication hole is disposed or the plurality of communication holes are collectively disposed and,
a combustion product non-discharge region being a region other than the combustion product discharge region; and
a housing including a peripheral wall portion and defining therein a first combustion chamber in which a first gas generating agent, the first ignition device, and the first inner tube member are provided, the peripheral wall portion being provided with
a first gas discharge port and a second gas discharge port having an opening pressure higher than an opening pressure of the first gas discharge port, the first gas discharge port and the second gas discharge port allowing the first combustion chamber and an outside of the housing to communicate with each other by opening upon receiving a combustion pressure
a communication hole-associated region associated with the combustion product discharge region and including only the first gas discharge port formed therein and a communication hole non-associated region associated with the combustion product non-discharge region and including the second gas discharge port formed therein, and a range of the communication hole-associated region is defined by a first imaginary straight line extending from a center axis of the surrounding wall portion, passing through one end portion of the combustion product discharge region in the circumferential direction of the surrounding wall portion and intersecting the peripheral wall portion, and a second imaginary straight line extending from the center axis of the surrounding wall portion, passing through another end portion of the combustion product discharge region in the circumferential direction of the surrounding wall portion and intersecting the peripheral wall portion, as viewed in an axial direction of the surrounding wall portion.

8. The gas generator according to claim 7, wherein
the communication hole-associated region is a region facing the combustion product discharge region in a radiation direction with respect to a center axis of the surrounding wall portion.

9. The gas generator according to claim 7, wherein
a center axis of the surrounding wall portion and a center axis of the peripheral wall portion are spaced apart,
the combustion product discharge region includes a first combustion product discharge region and a second combustion product discharge region that are located line-symmetrically to each other with an imaginary center line passing through the center axis of the surrounding wall portion and the center axis of the peripheral wall portion as an axis of symmetry, as viewed in the axial direction of the surrounding wall portion,
the communication hole-associated region includes a first communication hole-associated region and a second communication hole-associated region, the first communication hole-associated region being associated with the first combustion product discharge region, and the second communication hole-associated region being associated with the second combustion product discharge region,
the one or plurality of communication holes are formed and disposed, line-symmetrically with respect to the imaginary center line, in each of the first combustion product discharge region and the second combustion product discharge region, and
the first gas discharge port is formed and disposed line-symmetrically with respect to the imaginary center line, in each of the first communication hole-associated region and the second communication hole-associated region.

10. The gas generator according to claim 9, wherein
an opening pressure of the first gas discharge port formed in the first communication hole-associated region and an opening pressure of the first gas discharge port formed in the second communication hole-associated region are equal to each other.

11. The gas generator according to claim 7, further comprising:
a second ignition device;
a second gas generating agent configured to be burned by activation of the second ignition device;
a second combustion chamber in which the second ignition device and the second gas generating agent are disposed; and a second inner tube member having a tubular shape and being disposed in the housing, the second combustion chamber being formed in the second inner tube member, wherein the second inner tube member is disposed at a position not between the combustion product discharge region and the communication hole-associated region in a radiation direction with respect to a center axis of the surrounding wall portion.

12. The gas generator according to claim 7, wherein the one or plurality of communication holes are formed as a single hole extending in the circumferential direction of the surrounding wall portion over the combustion product discharge region.

13. An airbag device comprising:

an airbag; and the gas generator according to claim 1 causing the airbag to inflate.

14. An airbag device comprising:

an airbag; and the gas generator according to claim 7 causing the airbag to inflate.

* * * * *